Jan. 9, 1962  J. L. ANDRIEUX ET AL  3,016,288
ALUMINOTHERMIC PROCESS OF MAKING BORON, BORON
COMPOUNDS AND ALLOYS
Filed March 19, 1956
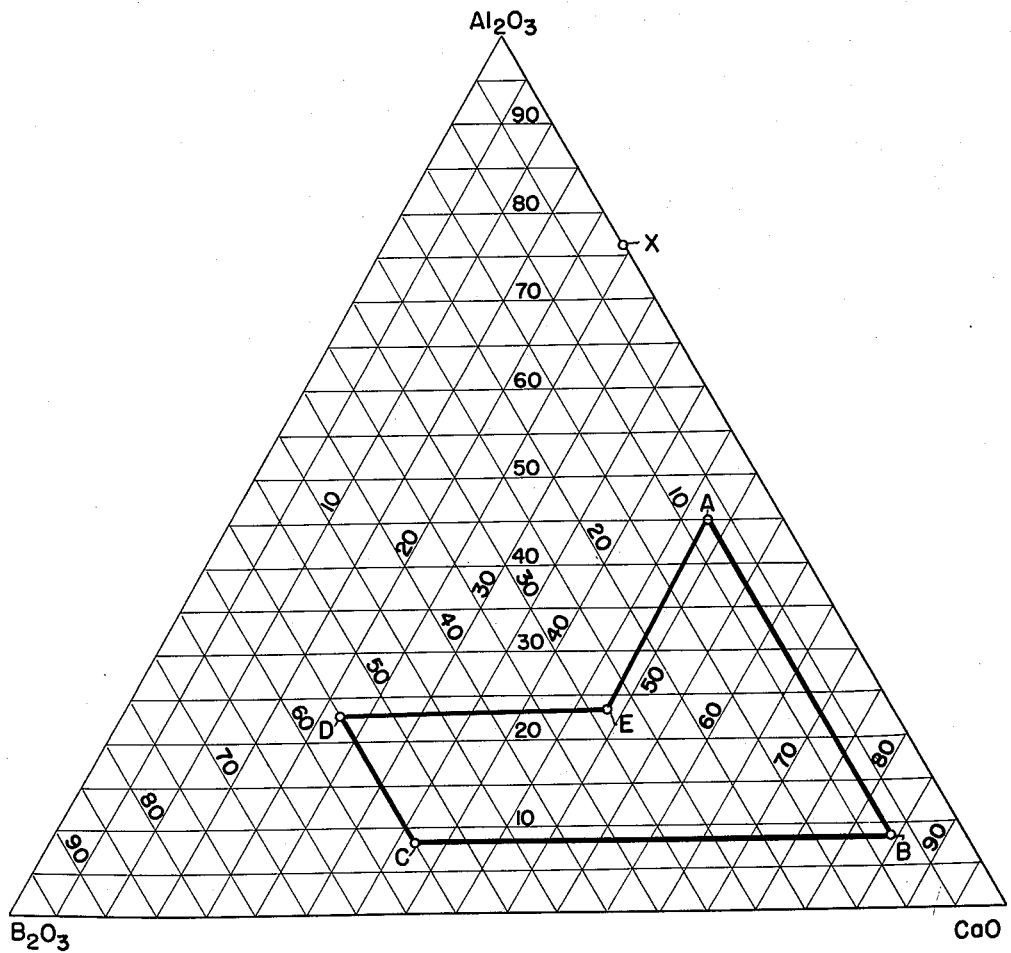
INVENTORS.
Jean Lucien Andrieux
Rene Peffen
BY Webb, Mackey + Burden
THEIR ATTORNEYS

3,016,288
ALUMINOTHERMIC PROCESS OF MAKING BORON, BORON COMPOUNDS AND ALLOYS
Jean Lucien Andrieux, Grenoble, and René Peffen, La Tronche, France (both % Societe d'Electro-Chimie d'Electro Metallurgie et des Acieries Electriques d'Ugine, 10 Rue du General Foy, Paris (8e), France)
Filed Mar. 19, 1956, Ser. No. 572,393
Claims priority, application France Mar. 22, 1955
2 Claims. (Cl. 23—204)

This invention relates to a process of preparing boron, borides and boron alloys (hereinafter called boron products) by use of the known aluminothermic method. The process involves the addition of a slag-forming agent to the initial charge materials use in the aluminothermic process to produce the desired boron products and a readily soluble slag. The slag then is easily removed from the boron product.

It is known that an aluminothermic process may be used to prepare boron alloys such as ferroboron, manganese boron and nickel boron. For example, ferroboron can be produced according to the reaction:

(1) $B_2O_3 + 4Al + Fe_2O_3 \rightarrow 2Al_2O_3 + 2FeB$

It is also know that an aluminothermic process cannot be used if the borides or boron alloys produced have very high melting points or low densities, because it is not possible to separate them from the slag ($Al_2O_3$) formed in the process by decanting or other chemical reagents. The borides or boron alloys produced in the reaction remain within the slag in this situation, and since the slag is composed of calcined alumina, it cannot be eliminated mechanically or chemically by dissolution in suitable reagents.

A process has been proposed for obtaining readily soluble slags in the aluminothermic production of metals in which the insoluble slags normally produced in the reaction are converted into aluminates of the alkaline or alkaline earth metals. These soluble slags may be readily removed from the desired metal product by dissolution in a suitable reagent. This conversion of the slags is accomplished by introducing into the initial reaction mixture an alloy of aluminum with an alkali or alkaline earth metal, the alloyed metal being added in an amount just sufficient to combine with the alumina to form a soluble aluminate.

We have found, however, that this process for producing soluble slags in the aluminothermic making of metals cannot be applied in the manufacture of boron products because the complex final slags obtained from the reaction always contain a substantially large proportion of boric anhydride. The presence of this boric anhydride in the final slags is due partly to the inherent imperfect yield of any aluminothermic reduction, and partly due to the necessity of using initial charges sufficiently rich in boric anhydride to avoid introducing aluminum into the desired products and to make the slag sufficiently acid to prevent the appearance of parasitic borides such as calcium boride in the product. This presence of excess boric anhydride in the slag completely modifies the nature and the chemical properties of the slags obtained, particularly their solubility. The conversion of the slags, obtained in an aluminothermic production of boron products, into alkaline or alkaline earth aluminates as proposed by the known methods is thus not applicable in the manufacture of boron products since the slags produced do not have a satisfactory degree of solubility.

The present invention avoids these difficulties by introducing into the charges used in the aluminothermic making of boron products, strictly calculated amounts of slag-forming agents capable of combining with alumina and boric anhydride to form complex slags which are readily soluble in the usual chemical reagents such as hydrochloric acid, nitric acid or soda solutions. The general character of the reaction is:

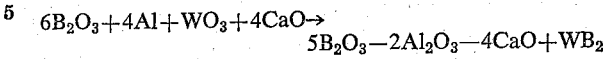

The ternary slag, $B_2O_3$—$Al_2O_3$—$CaO$, is soluble if the mol ratios of the constituents are maintained in a definite relationship to be explained hereinafter. The slag-forming agents to be added can be one or more of an alkaline or alkaline-earth material; for example, sodium, potassium, calcium, barium, or magnesium oxides or compounds containing these oxides. By the term "alkaline earth metal oxides" is meant calcium, barium or magnesium oxides.

The figure is a phase diagram of the ternary system $Al_2O_3$—$B_2O_3$—$CaO$ illustrating an area containing the compositions within the scope of the present invention when the added slag-forming agent is CaO.

To prepare boron, borides or boron alloys, a charge containing boric anhydride, an oxide of the metal to be alloyed with the boron, aluminum and a suitable slag-forming agent are thoroughly mixed and introduced into a furnace or crucible to bring about the aluminothermic reaction. If the boron is not to be alloyed with a metal, the charge will contain boric anhydride, aluminum, and a suitable slag-forming agent.

The proportions of the components in the charge; i.e., aluminum, boric anhydride, a slag-forming agent, and a metal oxide to be alloyed with the boron, must be calculated so that the amount of reducing agent (aluminum) is sufficient to reduce an amount of the metal oxide (or the compounds containing it) sufficient to combine with the boron to form the desired alloy, and also reduce a sufficient amount of the boric anhydride to introduce into the final product the desired amount of boron. However, the boric anhydride must not be all reduced since a definite mol percent is necessary in the slag to form the proper ternary system.

The amount of slag-forming agent added to the initial charge must be greater than the quantity necessary to form a soluble aluminate with the alumina produced in the reaction. In other words, the slag-forming agent must be added in a quantity greater than the stoichiometric amount necessary to combine with the alumina. The following exemplary compositions illustrate the molecular ratios of some of the soluble slags produced in the reaction.

(A) For the system $B_2O_3/Al_2O_3Na_2O$:
  (1) $2.5B_2O_3/1Al_2O_3/1.75Na_2O$;
  (2) $3B_2O_3/1Al_2O_31Na_2O$.

(B) For the system $B_2O_3/Al_2O_3/CaO$:
  (1) $0.25B_2O_3/Al_2O_3/1.25CaO$;
  (2) $0.50B_2O_3/Al_2O_3/1.60CaO$;
  (3) $0.80B_2O_3/Al_2O_3/1.80CaO$;
  (4) $1B_2O_3/Al_2O_3/2.0CaO$;
  (5) $1.5B_2O_3/Al_2O_3/2.30CaO$;
  (6) $2B_2O_3/Al_2O_3/2.20CaO$;
  (7) $2B_2O_3/Al_2O_3/1.55CaO$;
  (8) $2.5B_2O_3/Al_2O_3/2.20CaO$;
  (9) $2.5B_2O_3/Al_2O_3/1.55CaO$;
  (10) $3B_2O_3/Al_2O_3/1.8CaO$.

Referring more particularly to the figure, the lines connecting the points A, B, C, D, E and A, enclose an area in which the mol ratios of the ternary system $B_2O_3$—$Al_2O_3$—$CaO$ are such that the slag is soluble in the usual reagents. The point X on the figure illustrates the mol ratio used in the known method of producing soluble slags.

The compositions of the slags (expressed in mol percents) represented by points A–E are given in the following table:

| Slag | $Al_2O_3$ | CaO | $B_2O_3$ |
| --- | --- | --- | --- |
| A | 45 | 47.5 | 7.5 |
| B | 8.5 | 84 | 7.5 |
| C | 8.5 | 36.5 | 55.0 |
| D | 23 | 22.0 | 55.0 |
| E | 23.5 | 47.5 | 29.0 |

The present invention involves a technique for producing boron, borides and boron alloys which is safe, simple and inexpensive. The complex slags formed are homogeneous and have a well-defined composition, which insures their total solubility. Furthermore, the boron, borides or boron alloys obtained are stabilized against any further change into undesirable compounds due to the fact that the slag covers the prepared boron containing products and it is not necessary to perform the process under vacuum or controlled atmosphere.

As an alternative to using boron anhydride in the initial charge, it is possible, according to the present invention, to begin with an artificial or natural borate; for example, borax, colemanite, or other chemical compounds of suitable purity, containing boric anhydride. In using the artificial or natural borates, the partial reduction of the borax or colemanite by the aluminum produces products rich in boron and it is possible to extract from the slag the unreduced boric acid by treating the slag with hydrochloric acid. The alumina contained in the slag can also be recovered.

Instead of using metals in the form of pure metal oxide, to be alloyed or combined with boron, it is possible according to the present invention to use materials in the form of artificial or natural oxidized chemical compounds; for example, scheelite or calcium molybdate. It is also possible to use the pure metals or alloys of the metal to be alloyed with the boron. It is possible to obtain, according to the present invention, most of the binary or complex combinations and alloys of boron with the metals capable of combining with it, for example: aluminum, chromium, tungsten, molybdenum, titanium, zirconium, vanadium, niobium, tantalum, calcium, barium, thorium, or cerium.

For use as the reduction material, aluminum, silico-aluminum of sufficient purity, or alloys formed by aluminum with materials such as calcium or magnesium may be used. Further instead of using pure aluminum from a first smelting, it is permissible to use aluminum of a second smelting coming from recovered scraps and containing impurities such as copper, zinc, magnesium and silicon for the reduction agent, since these impurities do not alloy with boron under the conditions of the present process. The second smelting aluminum may be used in preparing products such as calcium boride or commercial boron.

In some cases, if the slag-forming agent contains lime or baryta, it is essential to carefully select the compositions of the soluble complex slags so that the concentration of the lime or baryta is sufficiently low and the acidity of the slag sufficiently high to prevent the possible formation of calcium or barium borides instead of the desired product.

The charge may be introduced into the reaction furnace or crucible as a single charge or preferably may be added gradually at a suitable rate. It is also within the scope of the present invention to use molten baths of the charge constituents and to use processes and devices suitable to promote the proper reaction between the metals, alloys and the slags in the molten state.

The borides having densities above 4 can be recovered simply and quickly by crushing the mass obtained from the reaction and separating the complex slag, which is not as dense as the borides, by proper mechanical or physical means such as flotation or air separation. Any residual slag which adheres to the boride particles is then dissolved in the usual reagents.

When the materials introduced into the initial charge contain silica, it is advisable to dissolve the final slag by alternating treatments with hydrochloric acid and soda leaches.

The following illustrative examples define some of the modes of practicing the present invention:

Example 1

To prepare calcium boride, $CaB_6$, 168 kgs. of aluminum, 210 kgs. of boric anhydride, and 240 kgs. of quicklime were carefully mixed. The three constituents were of suitable granular size for the reaction. The amount of lime added was sufficient to form the desired calcium boride and also to form the complex soluble slag. The mixture of the constituents was thrown, in successive portions, into a refractory crucible which had been brought to a temperature sufficient to start the reduction and to insure the formation of the desired soluble slag. The mass obtained from the reaction was finely crushed and treated numerous times, when hot, with dilute hydrochloric acid. The final treatment was with concentrated hydrochloric acid. The slag was easily dissolved by this treatment and the calcium boride was thereby collected. The yield of calcium boride was about 84.1%.

To produce calcium boride in this manner, it is not necessary to use raw materials of a high purity. Aluminum of a second smelting, which may contain copper, zinc, silicon or magnesium can be used.

The boric anhydride or the lime borates used can contain, among other things, silica, alumina, iron oxides, lime or magnesia. Likewise, the lime used need not be of high purity.

Example 2

(a) To prepare a boron suboxide, 210 kgs. of boric anhydride, 56 kgs. of aluminum, and 87 kgs. of calcium oxide were thoroughly mixed and introduced into a reaction crucible. The reaction mass was removed and the slag dissolved. The boron suboxide produced was found to contain 75.10% boron, 0.75% calcium, and 24.15% oxygen. The yield, calculated from the weight of the reducing aluminum used, was about 87.2%.

(b) Another boron suboxide was produced by mixing 280 kgs. of boron anhydride, 56 kgs. of aluminum, and 112 kgs. of calcium oxide together and introducing the charge into a reaction crucible. After removal of the slag from the reaction mass, the suboxide produced had a composition of about 79.20% boron, 0.35% calcium, and 20.45% oxygen. The yield, calculated from the weight of the reducing aluminum used, was about 95.2%.

The quantities of lime chosen for the reactions in this example were calculated according to the principles stated in Example 1.

The aluminum, boric anhydride and lime may contain impurities in the same manner as stated in Example 1.

Example 3

An initial charge containing 350 kgs. of borax and 57 kgs. of aluminum were reacted to produce a complex ternary slag containing unreduced borax and a boron-containing product comprising 89.20% boron, 7.70% aluminum, and 3.10% oxygen. The boron-containing product was easily separated from the slag by dissolving the latter in dilute hydrochloric acid.

The yield, calculated from the weight of aluminum used, was about 91.2%.

The materials used in the initial charge in this example can contain the same impurities mentioned in Example 1 without detrimentally affecting the reaction.

Industrially, boric anhydride is often extracted from these ores by suitable acid treatments and crystallizations.

Example 4

(a) An initial charge of 232 kgs. of tungstic acid, 88 kgs. of boric anhydride, 94 kgs. of aluminum, and 148 kgs. of quicklime of suitable purity and granular size were thoroughly mixed and reacted to produce a tungsten-boron alloy containing about 5.80% boron. The yield, calculated from the aluminum used, was about 85.10%.

(b) An initial charge of 232 kgs. of tungstic acid, 420 kgs. of boric anhydride, 136 kgs. of aluminum, and 216 kgs. of quicklime were thoroughly mixed and reacted to produce a tungsten-boron alloy containing about 10.65% boron. The yield, calculated from the aluminum used, was about 75.3%.

In both of the above examples, (a) and (b), the complex slag obtained was dissolved in hydrochloric acid. To remove any traces of tungstic acid, the hydrochloric acid treatment was followed by a treatment with hot dilute ammonia.

The amounts of lime used in this example were chosen according to the principles stated in Example 1.

Example 5

A titanium boride, $TiB_2$, was prepared by mixing 80 kgs. of titanium oxide, 160 kgs. of boric anhydride, 105 kgs. of aluminum, and 195 kgs. of quicklime, reacting the mixture in a furnace and dissolving the complex slag by treatment with cold concentrated hydrochloric acid. The yield, calculated from the reducing aluminum, was about 84.5%.

The titanium boride is subject to attack by hot dilute hydrochloric acid and thus, the use of cold concentrated hydrochloric acid was necessary. Likewise, the borides of zirconium and vanadium are subject to attack by hot dilute hydrochloric acid and thus, the use of cold concentrated hydrochloric acid is advisable in dissolving the slag in the preparation of these compounds. It should be further noted that the chromium borides, such as CrB, are generally easily attacked by hydrochloric acid and thus, the complex slags must be dissolved by alternating treatments with hot dilute nitric acid and hot soda leaches.

The amount of lime used in this example was chosen according to the principles stated in Example 1.

While we have described a present preferred embodiment of our invention, it is to be understood that it may be otherwise embodied within the scope of the following claims.

We claim:

1. A method of aluminothermically producing boron, comprising mixing a charge material containing boric anhydride, aluminum and calcium oxide; heating the mixture to form a mass including the boron interspersed in a soluble slag; the charge material being proportioned to produce the boron and said slag consisting essentially of a ternary system $B_2O_3$—$Al_2O_3$—$CaO$ in which the mol percentages of $B_2O_3$, $Al_2O_3$ and $CaO$ are within the area A-B-C-D-E-A shown in the figure; said boron being incapable of separation from said slag by decantation; solidifying the slag and boron; dissolving the slag in a medium selected from the group consisting of hydrochloric acid, nitric acid and caustic soda solutions, and recovering the boron.

2. A method of aluminothermically producing borides and boron alloy products having melting points too high and densities too low to permit separation by decantation between the products and the slag formed in the method; comprising mixing a charge material containing boric anhydride, aluminum, calcium oxide, and a material from the group consisting of metals and metal oxides to combine with the boron in said products; heating the mixture to form a mass including said product interspersed in a soluble slag; said charge material being proportioned to produce the product and said slag consisting essentially of a ternary system $B_2O_3$—$Al_2O_3$—$CaO$ having mol percentages of $B_2O_3$, $Al_2O_3$ and $CaO$ within the area A-B-C-D-E-A shown in the figure, said product being incapable of separation from the slag by decantation; solidifying the slag and product; dissolving the slag in a medium selected from the group consisting of hydrochloric acid, nitric acid and caustic soda solutions; and recovering the product.

References Cited in the file of this patent

UNITED STATES PATENTS

| | | |
|---|---|---|
| 1,964,139 | Pokorny et al. | June 26, 1934 |

FOREIGN PATENTS

| | | |
|---|---|---|
| 16,956 of 1909 | Great Britain | July 20, 1910 |
| 16,685 of 1896 | Great Britain | June 12, 1897 |

OTHER REFERENCES

Kahlenberg: "Transactions of the American Electrochemical Society," vol. 47, pages 33–34 (1925).

Friend: "Textbook of Inorganic Chemistry," 1917, vol. IV, pages 7 and 25.

Mellor: "Comprehensive Treatise on Inorganic and Theoretical Chemistry." 1924, vol. V, page 24.